United States Patent [19]
Yamamoto

[11] Patent Number: 5,806,247
[45] Date of Patent: Sep. 15, 1998

[54] SEALING STRUCTURE OF DOOR FOR VEHICLE

[75] Inventor: Takeshi Yamamoto, Saitama-ken, Japan

[73] Assignee: Honda Giken Kogyo Kabushiki Kaisha, Tokyo, Japan

[21] Appl. No.: 735,084

[22] Filed: Oct. 22, 1996

[30] Foreign Application Priority Data

Oct. 24, 1995 [JP] Japan .................................. 7-275731

[51] Int. Cl.⁶ ...................................................... E06B 7/16
[52] U.S. Cl. ...................... 49/495.1; 49/490.1; 49/475.1
[58] Field of Search ............................... 49/490.1, 475.1, 49/495.1, 440, 441

[56] References Cited

U.S. PATENT DOCUMENTS

| | | | |
|---|---|---|---|
| 4,653,801 | 3/1987 | Shirasu et al. ...................... | 49/495.1 X |
| 4,945,681 | 8/1990 | Nozaki et al. .......................... | 49/495.1 |
| 4,951,418 | 8/1990 | Keys .................................... | 49/490.1 X |
| 4,956,941 | 9/1990 | Vaughan ............................... | 49/490.1 X |
| 5,024,480 | 6/1991 | Petrelli ................................. | 49/490.1 X |
| 5,038,521 | 8/1991 | Andrzejewski et al. ............ | 49/495.1 X |
| 5,209,019 | 5/1993 | Morita ................................. | 49/495.1 X |
| 5,590,926 | 1/1997 | Nozaki ................................ | 49/490.1 X |

FOREIGN PATENT DOCUMENTS 3-83117  8/1991  Japan .

*Primary Examiner*—Jerry Redman
*Attorney, Agent, or Firm*—Armstrong, Westerman, Hattori, McLeland & Naughton

[57] ABSTRACT

A sealing structure of a door for a vehicle has a glass run mounted on an external side surface, as seen widthwise of the vehicle, of a door sash. A flange is formed on an outer edge of the door sash so as to bend outwards as seen widthwise of the door. A parting seal is mounted on the flange and has a seal lip protruding towards an outer side of the door sash to elastically abut a vehicle body. The parting seal has a lip portion which contains therein a core and which, together with the core, extends towards an inner side so as to cover the glass run from outside as seen widthwise of the vehicle.

1 Claim, 1 Drawing Sheet

SEALING STRUCTURE OF DOOR FOR VEHICLE

BACKGROUND OF THE INVENTION

1. Field of the Invention

The present invention relates to a sealing structure of a door for a vehicle such as a motor vehicle, in particular, of a sashed door for a vehicle.

2. Description of the Related Art

As this kind of door for a vehicle, there is known a door in which the cross section of a door sash is formed into the shape of a channel or a groove which opens inwards for mounting therein a glass run, as well as a door in which, instead of forming the door sash into the shape of a channel, a glass run is mounted on an external side surface of the door sash as seen widthwise of the vehicle (i.e., as seen in the direction of width of the vehicle).

The latter type of door is normally called a flush surface type of construction and has an advantage in that the visible width of the door sash becomes small with a consequent good aesthetic appearance. In this flush surface type of construction, there is formed on an outer edge of the door sash a flange which is bent outwards as seen widthwise of the vehicle. To this flange is mounted a parting seal having a seal lip which protrudes towards an outer side of the door sash to elastically abut a vehicle body.

In this case, since the line of connection between the glass run and the parting seal is visible to an external appearance, there is also disclosed the following sealing structure of a door in Japanese Published Unexamined Utility Model Registration Application No. 83117/1991. Namely, in the parting seal there is formed a lip portion which extends towards a inner side so as to cover the glass run from the external side as seen widthwise of the vehicle, thereby keeping the glass run out of sight.

When the vehicle theft (or stealing) cases are investigated, the following fact has been found out. Namely, there is a possibility that a door lock is unlocked by inserting a stealing (or unlocking) tool between a door pane and the glass run.

In this case, if the door sash is formed into the shape of a channel, the door sash will become a hindrance to the insertion of the stealing tool. In the flush surface type of construction, on the other hand, even with the type in which the parting seal is provided with a lip portion to cover the glass run, the stealing tool can easily be inserted by peeling off the lip portion.

In view of the above-described point of the prior art, the present invention has an object of providing such a sealing structure in a flush surface type of construction of door for a vehicle as will have an effect of preventing the stealing of the vehicle.

SUMMARY OF THE INVENTION

In order to attain the above and other objects, the present invention is a sealing structure of a door for a vehicle comprising: a glass run mounted on an external side surface, as seen widthwise of the vehicle, of a door sash; a flange formed on an outer edge of the door sash so as to bend outwards as seen widthwise of the vehicle; a parting seal mounted on the flange, the parting seal having a seal lip protruding towards an outer side of the door sash to elastically abut a vehicle body; wherein the parting seal comprises a lip portion which contains therein a core and which extends towards an inner side so as to cover the glass run from outside as seen widthwise of the vehicle.

Preferably, the core in the lip portion has a wrapping allowance relative to a door pane in its closed condition.

By arranging the lip portion so as to contain therein the core, it becomes impossible to peel off or peel upwards the lip portion, with the result that the stealing tool cannot be inserted into the space between the glass run and the door pane. Therefore, in this arrangement, the effect of preventing the vehicle from being stolen can be attained without impairing the aesthetically good appearance of the flush surface type of door.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
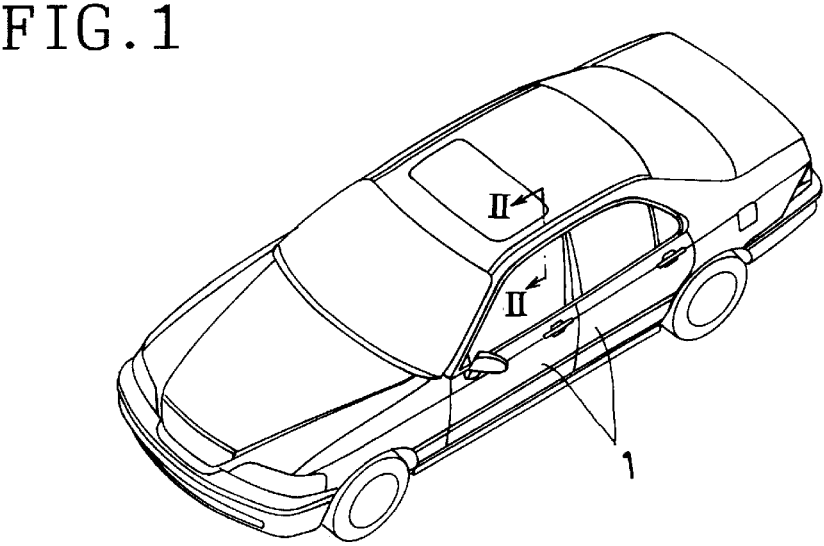
FIG. 1 is a perspective view of a vehicle provided with a door to which the present invention is applied.

An explanation will now be made about an embodiment in which the present invention is applied to a sealing structure of a door 1 for a vehicle shown in FIG. 1.

Figure 2:
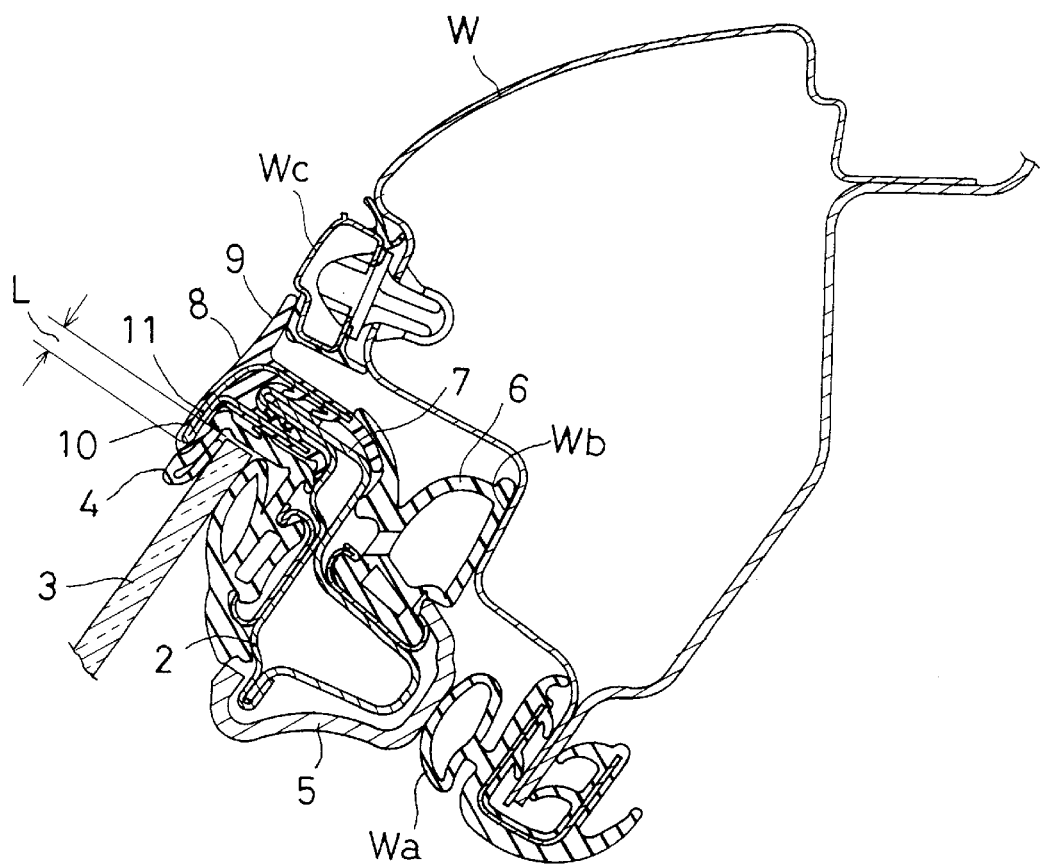
FIG. 2 is an enlarged sectional view taken along the line II—II in FIG. 1.

The door 1 is a sashed door. A flush surface type of construction of door is constituted by providing an external side surface of the door sash 2, as seen widthwise of the vehicle, with a glass run 4 for receiving therein an outer edge of a door pane 3, as shown in FIG. 2. An internal side surface of the door sash 2, as seen widthwise of the vehicle, is provided with an inner molding 5 which abuts an opening seal Wa mounted on a door opening of the vehicle body W, and with an inner weather strip 6 which resiliently abuts a stepped surface Wb on this side (i.e., on an outer side as seen widthwise of the vehicle) of the door opening.

Further, on an outer edge of the door sash 2, there is formed a flange 7 which is bent outwards as seen widthwise of the vehicle. To this flange 7 there is mounted a parting seal 8, which is made, e.g., of a flexible resin, in a manner to clamp the flange 7.

The parting seal 8 is provided with a seal lip 9 which protrudes towards an outer side of the door sash 2. It is thus so arranged that the seal lip 9 is elastically abutted with a molded frame Wc which is mounted on an external side surface of the vehicle body W.

In the parting seal 8 there is formed a lip portion 10 which extends towards an inner side so as to cover the glass run 4 from an external side as seen widthwise of the vehicle. In the parting seal 8 there is also embedded or buried a core 11 for reinforcing that portion of the parting seal 8 with which it is mounted on (or attached to) the flange 7. This core 11, which is made, e.g., of a metallic plate, extends through the lip portion 10.

In this arrangement, the lip portion 10 contains therein the core 11 and, therefore, cannot be peeled off. Even if an attempt is made to insert the stealing tool into the space between the glass run 4 and the door pane 3, the lip portion 10 functions as an obstacle to the insertion of the stealing tool, with the result that the lip portion 10 effectively serves to prevent the theft of the vehicle.

It may also be so arranged that the external surface of the glass run 4 is entirely covered by the lip portion 10.

However, it is sufficient if the lip portion 10 is formed to such a degree as to secure a wrapping or covering allowance L for the core 11 to wrap or cover the door pane 3 in its closed condition.

It is readily apparent that the above-described sealing structure of a door for a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A sealing structure of a door for a vehicle, comprising:

a glass run mounted on an external side surface, as seen widthwise of the vehicle, of a door sash;

a flange formed on an outer edge of said door sash so as to bend outwards as seen widthwise of the vehicle;

a parting seal mounted on said flange, said parting seal having:

a mounting portion with which said parting seal is mounted on said flange;

a seal lip protruding towards an outer side of said door sash to elastically about a body of the vehicle; and a lip portion extending toward an inner side so as to cover said glass run from outside as seen widthwise of the vehicle;

wherein said parting seal includes a core embedded therein, said core being integrally formed and extending from said mounting portion of said parting seal through said lip portion of said parting seal such that said core in said mounting portion grips said flange; and wherein said core has mounting legs in said mounting portion of said parting seal and said core has a wrapping portion in said lip portion of said parting seal such that said wrapping portion is thicker in width than said mounting legs and said wrapping portion extends below a top edge of a door pane when the door pane is in a closed position in the vehicle.

* * * * *

UNITED STATES PATENT AND TRADEMARK OFFICE
CERTIFICATE OF CORRECTION

PATENT NO.: 5,806,247
DATED : September 15, 1998
INVENTOR(S): Takeshi YAMAMOTO

It is certified that error appears in the above-identified patent and that said Letters Patent is hereby corrected as shown below:

Column 4, line 4: change "about" to read --abut--.

Signed and Sealed this

Second Day of November, 1999

Attest:

Attesting Officer

Q. TODD DICKINSON

Acting Commissioner of Patents and Trademarks